Figure 1:
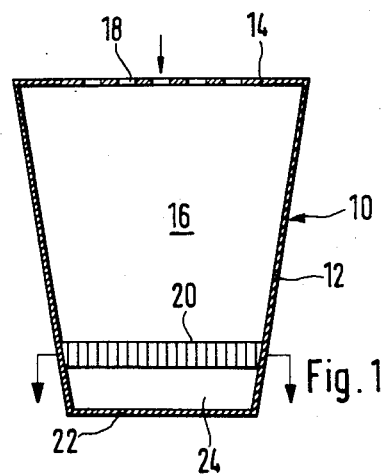

United States Patent [19]

Alhäuser et al.

[11] Patent Number: 4,741,828

[45] Date of Patent: May 3, 1988

[54] FILTER CARTRIDGE FOR THE IMPROVEMENT OF THE QUALITY OF DRINKING WATER

[76] Inventors: Erich Alhäuser, Am Hölzeberg 2; Herbert Bendlin, Gothaer Str. 14, both of D-5412 Ransbach-Baumbach, Fed. Rep. of Germany

[21] Appl. No.: 877,258

[22] Filed: Jun. 23, 1986

[30] Foreign Application Priority Data

Jun. 27, 1985 [DE] Fed. Rep. of Germany ....... 3522966
Sep. 9, 1985 [DE] Fed. Rep. of Germany ....... 3532052
Oct. 5, 1985 [DE] Fed. Rep. of Germany ....... 3535678

[51] Int. Cl.⁴ .................. B01D 23/10; B01D 27/02
[52] U.S. Cl. .................. 210/264; 210/282; 210/283; 210/501
[58] Field of Search .............. 210/264, 266, 282, 283, 210/284, 293, 501, 473, 477, 416.3; 422/101, 102

[56] References Cited

U.S. PATENT DOCUMENTS

| 3,715,035 | 2/1973 | Teeple, Jr. et al. | 210/284 |
| 3,819,055 | 6/1974 | Skinner | 210/477 |
| 3,879,292 | 4/1975 | McClive | 210/282 |
| 4,072,615 | 2/1978 | McConnell | 210/282 |
| 4,287,057 | 9/1981 | Stanley | 210/501 |
| 4,309,992 | 1/1982 | Dodak et al. | 210/266 |
| 4,368,123 | 1/1983 | Stanley | 210/282 |
| 4,396,512 | 8/1983 | Beauman et al. | 210/266 |
| 4,555,347 | 11/1985 | O'Dowd et al. | 210/283 |
| 4,578,187 | 3/1986 | Alhauser | 210/266 |

Primary Examiner—Richard V. Fisher
Assistant Examiner—Wanda L. Millard
Attorney, Agent, or Firm—Larson and Taylor

[57] ABSTRACT

Filter cartridge for the improvement of the quality of drinking water, consisting of a vessel (10) with sieve-type covered apertures (18, 44) filled with a compound (16) of ion exchange resin and/or absorbent carbon together with a bacterio-statically effective material, in particular silver, in dissociable form, through which the water to be treated is conducted mainly in a downwards direction, the vessel having a collection space (48), for a limited quantity of water, originating from the vessel's floor (42), which is separated from the outlet aperture (44). Thus drying out of the cartridge through non-use over a longer period of time or through misuse is prevented and the effectiveness of the bacterio-statically effective material is retained to combat the feared multiplication of germs in the treatment compound.

12 Claims, 2 Drawing Sheets

FILTER CARTRIDGE FOR THE IMPROVEMENT OF THE QUALITY OF DRINKING WATER

The invention is concerned with a filter cartridge for the improvement of the quality of drinking water, consisting of a vessel filled with ion exchange resin and/or absorbent carbon together with a bacterio-statically effective material, in particular silver, in dissociable form with sieve-type covered apertures for a mainly downwards directed conduction of the water.

It is well known in practice that bacteria can multiply extensively in such filter cartridges if the cartridges dry out, because the bacterio-statically effective material, in particular silver, can no longer become effective in dissociated form. Most appliances in which such cartridges are used, see to it that the cartridge remains constantly filled with water by arrangement of the cartridge inside a container which collects the treated water, the container having an outlet aperture located at a high point. However the danger of drying out cannot always be avoided and not with sufficient security, especially when the aforementioned container is intended for pouring out the water and is not sufficiently refilled thereafter (BRITA water filter, ERLO-MAT drinking-water filter).

The objective of the invention to prevent the drying out of the cartridge filling with the danger of multiplication of germs in such instances also.

An initial solution of the aforementioned objective consists in the vessel having a collection space originating on its floor, for a limited quantity of water, which is separated from the outlet aperture.

The invention is based on the fact that it is not absolutely essential, at least for a limited period of time, to maintain the water level inside the filter cartridge up to the upper end of the resin fill. In practice it is rathermore sufficient if a limited amount of water is retained in the lower region of the cartridge, which diffuses into this on contact with the filling. The bacterio-statical effectiveness of the anti-bacteriological medium contained in the filling, in particular silver, can be maintained by the residual moisture, at least over a limited period of time.

Filtration devices with vessels designed such that a defined residue quantity of fluid remains after termination of the filtration process are in fact already known under the U.S Pat. Nos. 4,256,585 and 4,162,054. However, there coffee or tea filters for the once off infusion of an appropriate beverage are dealt with, whereby the vessel designs quoted ought to combat further dripping by retention of a residual quantity of the infusion liquid which has passed through the filter filling. As these filters are emptied subsequently and are refilled for each later infusion, the problem upon which the invention is based of the multiplication of germs when the filter filling dries out is not present there.

A second solution of the aforementioned objective consists in the collection space being formed within a lower part of the vessel widening suddenly opposite an upper part of the vessel, the lower part opening upwards in the region of the widening to form the cartridge's outlet.

Thereby the outlet which is normally located at the lower end of the cartridge for the downwards directed conduction of the water is relocated at a higher level, so that the water quantity lying below this is retained in the cartridge automatically and at the same time this quantity of water is rinsed out when the cartridge is used and hence renewed. Ageing of the water collecting in dead spaces is thus avoided.

Advantageous versions of the invention result from the sub-claims together with the following description of some of the practical examples illustrated diagramatically in the attached FIGS. 1 through 9 in vertical cross-section.

In the practical examples as per FIGS. 1 through 5, the blunt cone-shaped vessel of a filter cartridge is designated throughout by 10, this having a jacket wall 12 and an upper wall 14. The cartridge is filled with a water-permeable treatment compound 16 in the form of ion exchange resin and/or absorbent carbon together with a bacterio-statically effective material, in particular silver, in dissociable form which receives a stream of infed water downwards via a sieve-type covered inlet aperture 18 in the upper wall 14, leaving the cartridge again via an outlet aperture in its lower region with improved quality.

The outlet aperture designated in FIG. 1 by 20 is formed by a perforation arranged in the jacket wall 12 of the cartridge at a distance above its flat and closed floor 22, whereby a collection space is created in part 10 of the vessel lying below this, in which a limited quantity of water is retained being sufficient to maintain the treatment compound sufficiently moist in the entire cartridge so that the effectiveness of the anti-bacteriological material can be deployed and the multiplication of germs be prevented.

Figure 2:
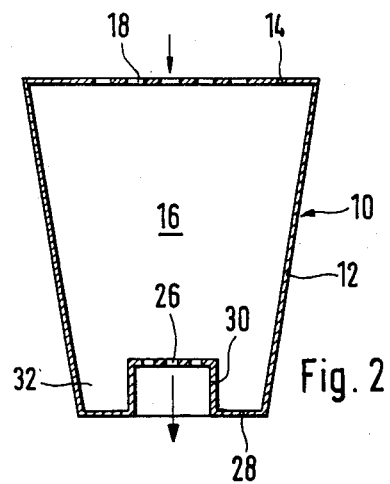

In FIG. 2 the outlet aperture 26 is arranged in the center of the floor above the ring-shaped floor area 28 which is recessed in comparison, from which an annular wall 30 enclosing the sieve-type covered aperture 26 extends upwards. A collection space 32, corresponding with the collection space 24 as per FIG. 1, is formed thereby below the opening 26 between the annular wall 30 and the jacket wall 12 of the vessel 10.

Figure 3:
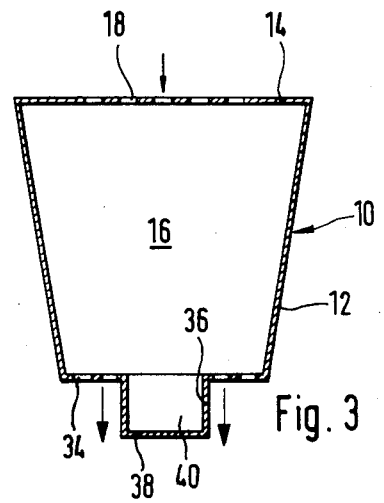

In FIG. 3 the container floor comprises a sieve-type covered outlet aperture 34 in annular form and has a recessed and closed part 38 adjoining a collar wall 36 within this aperture, above which a collection space 40 is formed.

Figure 4:
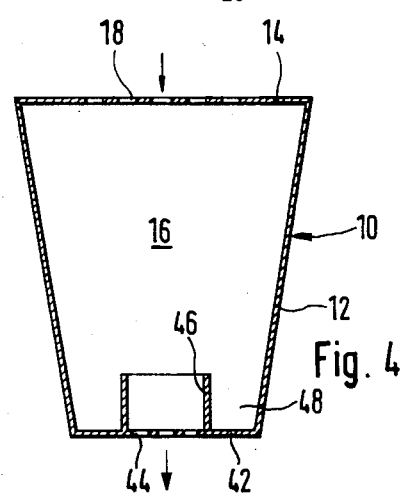

The container floor is designed flat in FIG. 4 and contains a circular-shaped, sieve-type covered outlet aperture 44 in its central part, which is enclosed by an annular wall 46 extending upwards from the floor 42. The height of the annular wall 46 determines the volume of a collection space 48 formed between the annular wall and the jacket wall 12 of the container.

Figure 5:
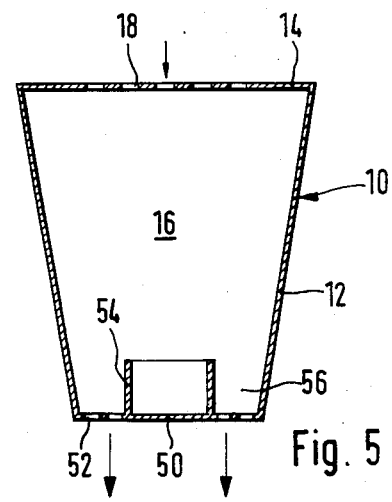

The container floor 50 is also designed flat in FIG. 5 and fitted with an annular-shaped, sieve-type covered outlet aperture 52 in the external area, the aperture being limited on the internal circumference by an annular wall 54 directed upwards originating on the container's floor. A collection space 56 is formed above the container floor 50 within the annular wall 54, whose volume is determined by the height of the annular wall 54.

In the practical examples described above in accordance with FIGS. 1 through 5 a sufficiently large quantity of water is constantly retained in each collection space, as already mentioned for the practical example as per FIG. 1, in order to maintain the entire treatment compound within the cartridge so moist that the bacterio-statically effective material contained therein is able to deploy its effectiveness and prevent the spread of microorganisms such as for example bacteria and germs.

Figure 6:
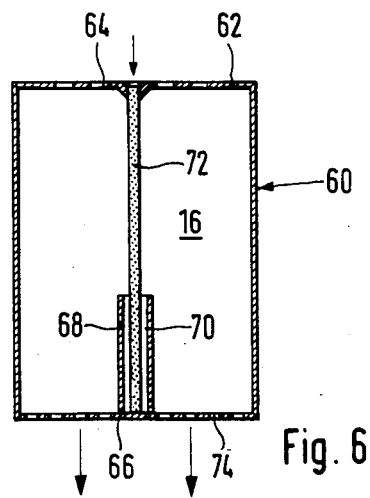

FIG. 6 shows a cartridge with a cylindrical vessel 60, which in turn has a sieve-type covered filling aperture 64 in its upper wall 62 and which is designed similarly to the practical example as per FIG. 5 in the lower region. The closed part of the container's floor 66 and the annular wall 68 resting on this, however, has a considerably smaller diameter relative to the vessel's diameter, whereby in comparison, the annular wall 68 has a considerably greater height. A wick 72 made of fleece protrudes out of the collection space 70 enclosed by the annular wall 68, the wick being fixed in a suitable manner to the upper wall 62 of the cartridge. The outlet aperture is designated by 74.

The wick 72 forms an element with capillary texture in which water from the container 70 rises and thus considerably improves the moisturisation of the treatment compound, in particular in the upper part of the cartridge.

It is self-evident that another material may be used in place of a wick made of fleece, which is able to transport water from the collection space 70 upwards and into the treatment material thanks to its capillary texture.

Figure 7:
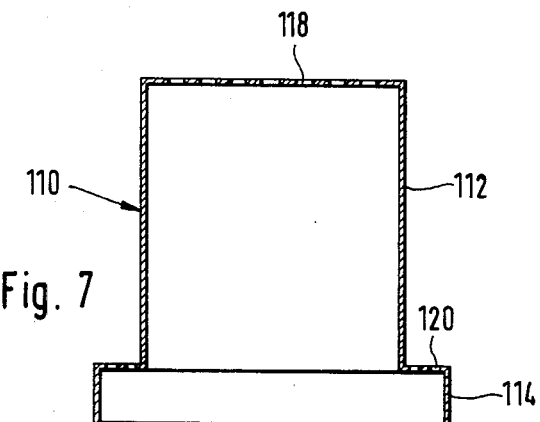

The rotationally symmetrically-shaped housing of a filter cartridge for the improvement of the quality of drinking water is designated in FIG. 7 by 110, this housing containing a filling (not shown) of ion exchange resin and/or absorbent carbon together with a bacterio-statically effective material, in particular silver, in dissociable form. The vessel 110 consists of a relatively long, cylindrical upper part 112 and comparatively only short, but considerably larger in diameter, lower part 114 with a closed floor 116. The open, upper end of the upper part 112 is covered in sieve-fashion to form an inlet aperture, as illustrated at 118. An appropriate sieve-type covering 120 between the upper part 112 and the lower part 114 forms outlet apertures of the cartridge directed upwards and at the same time connects the upper part 112 and the lower part 114 with one another.

When the cartridge is used, initially the inside of the cartridge fills up with water and then as much treated water runs out of the sieve-type covering 120 as is poured in through the sieve-type covering 118. If further pouring is stopped, the upper part 112 of the vessel empties whilst the lower part 114 remains filled and accounts for a constant retention of moisture of the filling contained therein by diffusion into the upper part. Upon re-utilisation of the cartridge the water remaining in the lower part 114 of the vessel is rinsed out by the water subsequently poured in and replaced by the water flowing in from the upper part 112.

Figure 8:
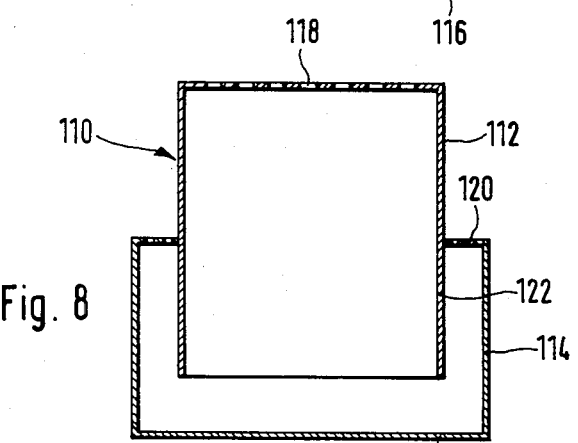

The amended version illustrated in FIG. 8 differs from that as per FIG. 7 in that the vessel's lower part 114 has a considerably greater height and hence the jacket wall of the upper vessel part 112 continues on into the lower part 114 of the vessel with a section 122. In this case the sieve-type covering 120, even though at a higher level, is however, arranged at the upper end of the lower part 114 of the vessel and thereby the entire lower part 114 of the vessel is filled with ion exchange resin and/or absorbent carbon together with the bacterio-statically effective material, whereby the water's travel through the filling can be extended and hence the treatment improved or the total height of cartridge shortened.

Figure 9:
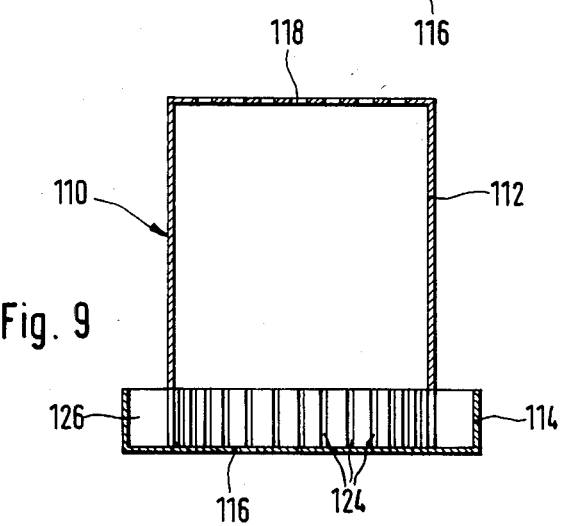

In the practical example as per FIG. 9 compared with FIG. 7 the jacket wall of the upper part 112 of the vessel extends to the floor 116 of the lower part 114 of the vessel and is fitted with slots 124 forming sieve-type covered openings above ths, through which the filling contained only inside the jacket wall of the upper part 112 of the vessel is prevented from escaping. The annular space 126 of the lower part 114 of the vessel, enclosed between the jacket wall of the upper part 112 of the vessel and its own jacket wall, is empty compared to this, so that the sieve-type covering 120 for the aperture directed upwards between the two jacket walls, shown in FIG. 7, can be dispensed with.

What we claim is:

1. Filter cartridge for the improvement of the quality of drinking water, consisting of a vessel having a bottom wall, a top wall and a circumferential jacket wall, said vessel being completely filled with a processing material together with a bacterio-statically effective material in dissociable form, said vessel further having a sieve-type covered inlet aperture and outlet aperture provided in said walls for a mainly downwards directed one-pass conduction of the water through the vessel, wherein the vessel also defines a collection space for a limited quantity of water trapped on said bottom wall, said collection space being separated from the outlet aperture such that water in said collection space is trapped to prevent the water from flowing freely to said outlet aperture.

2. Filter cartridge in accordance with claim 1, wherein the bottom wall is closed and wherein the outlet aperture is arranged on the jacket wall of the vessel at a distance above the closed bottom wall of the vessel and the collection space is formed by a vessel section extending below said outlet aperture.

3. Filter cartridge in accordance with claim 1, wherein the outlet aperture is arranged in the bottom wall of the vessel, a partition wall being provided on said bottom wall, said partition wall rising above said bottom wall to a limited height below said top wall and forming a closed trap section above the bottom wall which said closed section is separated from the path of the flow of water to said outlet aperture.

4. Filter cartridge in accordance with claim 1, wherein at least one capillary element in which water rises by a capillary action extends upwards through the processing material from the collection space to an upper region of the vessel.

5. Filter cartridge in accordance with claim 4, the element is a wick made of fleece fibre.

6. Filter cartridge in accordance with claim 1, wherein the bottom wall comprises an inner section and an outer section, said inner section and said outer section being arranged at different levels and being connected to each other by a circumferential intermediate wall, said outlet aperture being provided in the higher one of said inner section and said outer section.

7. Filter cartridge for the improvement of the quality of drinking water, consisting of a vessel having a bottom wall, a top wall and a circumferential jacket wall, said vessel being completely filled with a processing material together with a bacterio-statically effective material in dissociable form, said vessel having a sieve-type covered inlet aperture and outlet aperture provided in said walls for a mainly downwards directed conduction of the water, wherein the vessel also defining a cylindrical collection space for the retention of a limited quantity of water trapped on said bottom wall and wherein the collection space is formed within a lower cylindrical part of the vessel having a widened region immediately adjacent an upper cylindrical part of the vessel which said lower part opens upwards in the widened region to form said outlet aperture.

8. Filter cartridge in accordance with claim 7, wherein the widened region of the vessel extends over the entire circumference of the vessel.

9. Filter cartridge in accordance with claim 8, wherein the outlet aperture extends over the entire circumference of the widened region.

10. Filter cartridge in accordance with claim 9, wherein a section of the jacket wall above the widened region continues beyond the widened region into the lower part of the vessel.

11. Filter cartridge in accordance with claim 9, wherein the jacket wall of the upper part of the vessel ends at a distance above the bottom wall of said vessel.

12. Filter cartridge in accordance with claim 9, wherein the jacket wall of the upper part of the vessel extends down to the bottom wall of the vessel in order to limit filling to the lower part enclosed by the jacket wall and being fitted above the lower part with slots for the formation of a sieve-type covered pass aperture.

* * * * *